United States Patent
Stanford

(10) Patent No.: US 7,346,496 B2
(45) Date of Patent: Mar. 18, 2008

(54) METHOD AND APPARATUS TO PERFORM SPEECH RECOGNITION OVER A DATA CHANNEL

(75) Inventor: Michael Stanford, Dallas, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/620,974

(22) Filed: Jan. 8, 2007

(65) Prior Publication Data
US 2007/0174046 A1 Jul. 26, 2007

Related U.S. Application Data

(63) Continuation of application No. 10/012,964, filed on Dec. 7, 2001, now Pat. No. 7,162,414.

(51) Int. Cl.
*G10L 19/00* (2006.01)
*H04M 11/00* (2006.01)

(52) U.S. Cl. .......... 704/201; 704/270.1; 379/93.09

(58) Field of Classification Search ............ None
See application file for complete search history.

(56) References Cited

U.S. PATENT DOCUMENTS

| | | | | |
|---|---|---|---|---|
| 5,822,727 A | * | 10/1998 | Garberg et al. | 704/270.1 |
| 5,855,003 A | * | 12/1998 | Ladden et al. | 704/270 |
| 5,956,681 A | * | 9/1999 | Yamakita | 704/260 |
| 6,044,082 A | * | 3/2000 | Nygård et al. | 370/437 |
| 6,130,883 A | * | 10/2000 | Spear et al. | 370/328 |
| 6,185,535 B1 | * | 2/2001 | Hedin et al. | 704/270 |
| 6,442,404 B1 | * | 8/2002 | Sakajiri | 455/557 |
| 6,516,207 B1 | * | 2/2003 | Gupta et al. | 455/563 |
| 6,526,383 B1 | * | 2/2003 | Kurtz | 704/500 |
| 6,546,003 B1 | * | 4/2003 | Farris | 370/352 |
| 6,850,609 B1 | * | 2/2005 | Schrage | 379/202.01 |
| 6,940,819 B2 | * | 9/2005 | Kato | 370/237 |
| 2001/0025244 A1 | * | 9/2001 | Kopp | 704/275 |
| 2002/0116175 A1 | * | 8/2002 | Stouffer et al. | 704/9 |
| 2002/0119895 A1 | * | 8/2002 | Cook et al. | 508/186 |
| 2002/0165721 A1 | * | 11/2002 | Chang | 704/503 |
| 2003/0065427 A1 | * | 4/2003 | Funk et al. | 701/1 |

\* cited by examiner

*Primary Examiner*—David Hudspeth
*Assistant Examiner*—Matthew J. Sked
(74) *Attorney, Agent, or Firm*—Kacvinsky LLC

(57) ABSTRACT

Various embodiments directed to performing speech recognition over a data channel are described. One or more embodiments may comprise encoding voice information to be communicated over a voice channel using a voice compression algorithm, switching from said voice channel to a data channel, encoding voice information to be communicated over said data channel using said voice compression algorithm used for said voice channel, and communicating encoded voice information over said data channel. Other embodiments are described and claimed.

33 Claims, 7 Drawing Sheets

METHOD AND APPARATUS TO PERFORM SPEECH RECOGNITION OVER A DATA CHANNEL

This application is a continuation of U.S. patent application Ser. No. 10/012,964, which was filed on Dec. 7, 2001 and issued as U.S. Pat. No. 7,162,414 on Jan. 9, 2007.

BACKGROUND

Speech recognition technology is becoming increasingly popular to access automated systems. For example, speech recognition may be used to remotely navigate automated voice response systems, access voice enabled Internet portals, control home automation systems, and so forth. Wireless systems, however, may not have been designed to accommodate improvements in speech recognition technology. As a result, there may be a need to improve speech recognition in mobile or cellular communication systems.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings.

DETAILED DESCRIPTION

Figure 1:
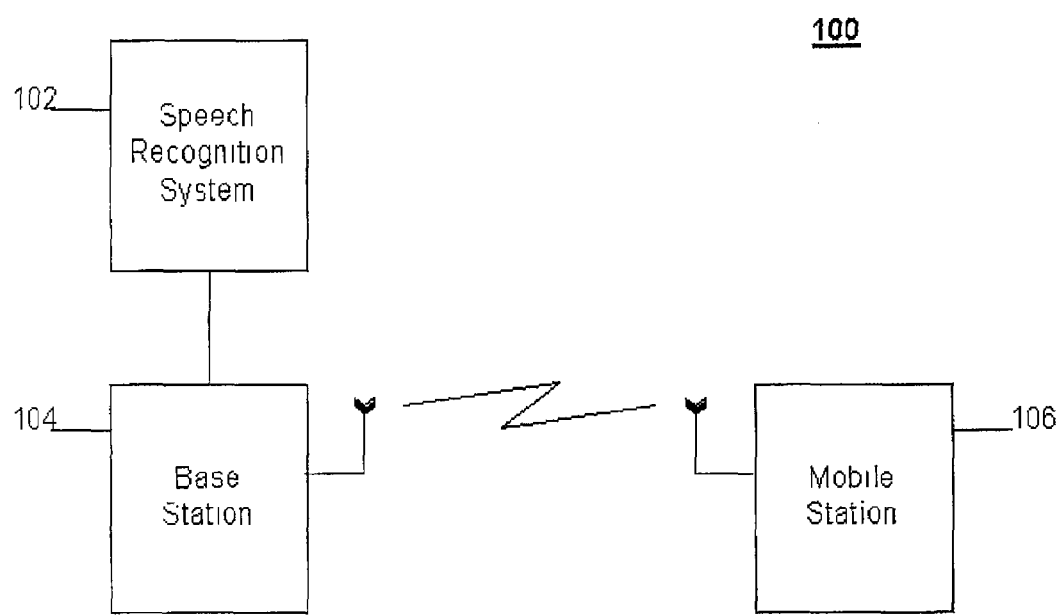
FIG. 1 is a system suitable for practicing one embodiment of the invention.

The embodiments of the invention may be directed to performing speech recognition over a wireless system. A wireless system typically communicates voice information using voice transmission techniques, and data information using data transmission techniques. Due to bandwidth limitations and temporal constraints, voice transmission techniques may result in lower quality speech than data transmission techniques. The lower quality speech may reduce the performance of speech recognition systems. One embodiment of the invention may improve the performance of speech recognition systems by transmitting voice information requested by a speech recognition system using higher quality data transmission techniques.

Communicating voice information using data transmission techniques may provide several advantages over conventional systems. For example, data transmission techniques typically do not have as tight temporal constraints as voice transmission techniques. A user may detect a longer pause than normal between words or clipped utterances due to temporal delays in a system, but typically will not detect a delay in receiving electronic mail or a web page, for example. Since a speech recognition system is typically not affected by speech delays, the increased latency incurred using data transmission techniques may not affect speech recognition performance. The higher quality speech resulting from data transmission techniques, however, may allow for increased accuracy in speech recognition. In another example, one embodiment of the invention allows the user to control when speech is transmitted using voice transmission techniques or data transmission techniques. This may allow the user to be more comfortable interacting with a speech recognition system, as well as reducing timing considerations such as detecting the start and end points of a speech command.

In this detailed description, numerous specific details are set forth in order to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

An embodiment of the invention may include functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Referring now in detail to the drawings wherein like parts are designated by like reference numerals throughout, there is illustrated in FIG. 1 a system suitable for practicing one embodiment of the invention. FIG. 1 is a block diagram of a wireless system 100. Wireless system 100 may comprise an automated speech recognition (ASR) system 102, a base station (BS) 104 and a mobile station (MS) 106. BS 104 and MS 106 may communicate information using RF spectrum using any conventional wireless technology that may include a voice communication technique and a data communication technique. In one embodiment of the invention, for example, BS 104 and MS 106 may be configured to communicate information in accordance with any of the various standards associated with Global System For Mobile Communications (GSM) and General Packet Radio System (GPRS).

In one embodiment of the invention, ASR system 102 may comprise an application server configured with hardware and/or software to operate as an ASR system capable of detecting speech and converting it to another format, such as text. The text may be used as input for any desired application. The term "automated" as used herein may refer to a system that operates with limited human intervention. Examples of various applications that may utilize an ASR system may include an IVR system, an Internet voice portal, a home automation system, an automated directory assistance application, and so forth. It is worthy to note that although FIG. 1 illustrates ASR system 102 as separate from BS 104, it can be appreciated that ASR system 102 may be combined with BS 104 and still fall within the scope of the invention.

In one embodiment of the invention, BS 104 may comprise two parts, such as a Base Transceiver Station (BTS) and a Base Station Controller (BSC) (not shown). The BTS may house a radio transmitter/receiver ("transceiver") that defines a cell, as well as handle the radio-link protocols with MS 104. The BSC may manage the radio resources for one or more BTSs. The BSC may handle radio-channel setup, frequency hopping, and handovers, and other wireless functions. The BSC may also connect BS 104 with a Mobile Switching Center (MSC) (not shown). An MSC may perform call switching between mobile users, and between mobile users and fixed users, for example. In one embodiment of the invention BS 104 may be configured with the appropriate hardware and/or software to communicate information in accordance with GPRS and other GSM services, such as Short Messaging Service (SMS), voice communications, and so forth.

In one embodiment of the invention, MS 106 may comprise mobile equipment configured to communicate both voice information and data information. The term "voice information" as used herein may refer to information produced by human vocal chords, including silent periods before, after and between utterances. The term "data information" as used herein may refer to any digital information, including digitized voice information, alphanumeric symbols, text, images, graphics, video and so forth. In one embodiment of the invention, MS 106 may be a "Class A" GPRS terminal that may configured with the appropriate hardware and/or software to support GPRS and other GSM services, such as SMS, voice transmission and others.

In one embodiment of the invention, MS 106 may communicate information to BS 104 over voice channels and data channels. The term "channel" as used herein may refer to a communications path between two devices. It may refer to the physical medium (e.g., different RF) or to a set of properties that distinguishes one channel from another. In one embodiment of the invention, voice information is typically communicated over one or more voice channels, and data information is typically communicated over one or more data channels. A voice channel may be characterized as having lower bandwidth and shorter temporal constraints than a data channel. A data channel may be characterized as having higher bandwidth and longer temporal constraints than a voice channel. MS 106 may be further described with reference to FIG. 2.

Figure 2:
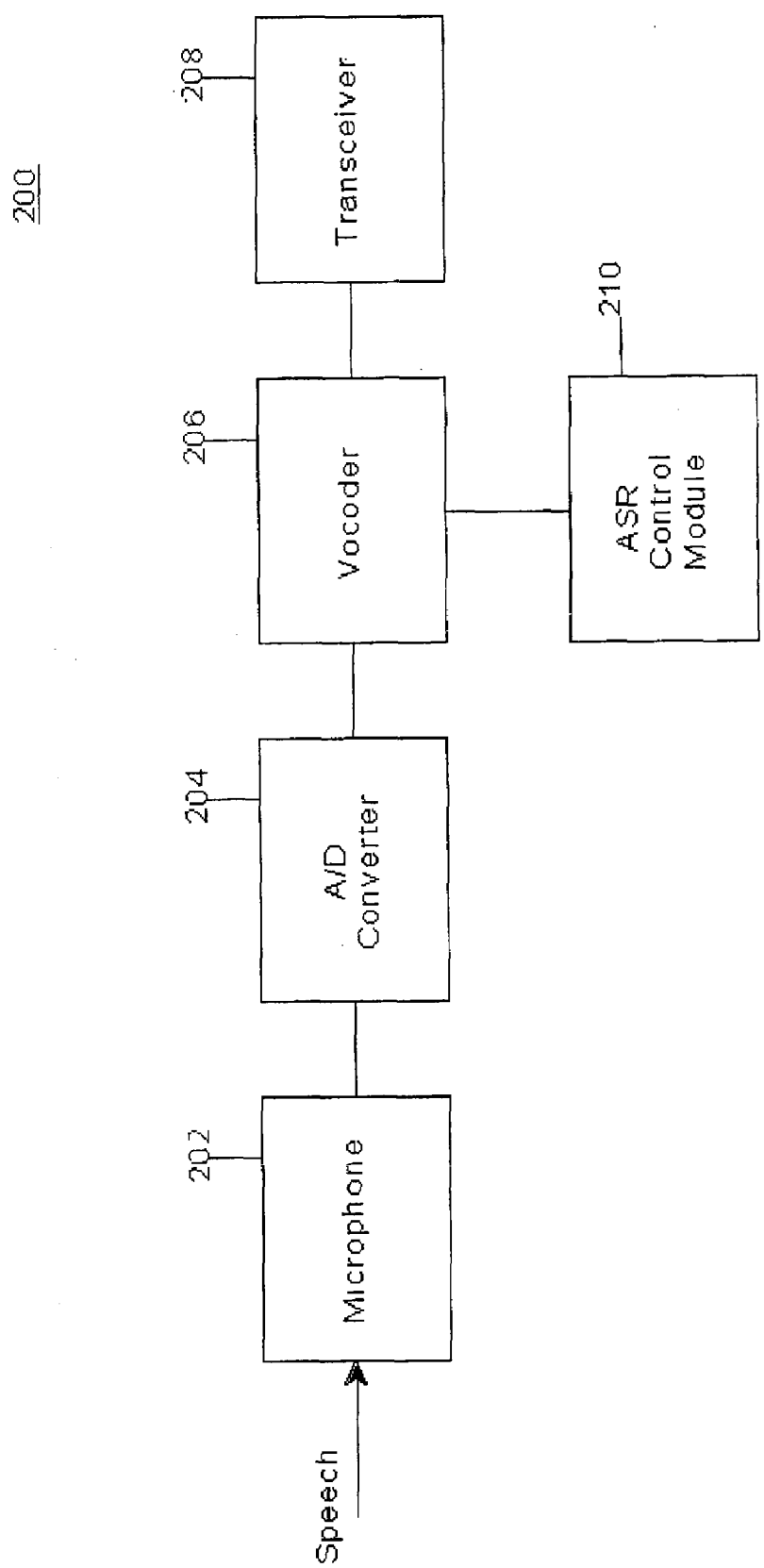
FIG. 2 is a first block diagram of a mobile station in accordance with one embodiment of the invention.

FIG. 2 is a first block diagram of a mobile station in accordance with one embodiment of the invention. FIG. 2 illustrates a MS 200 that may represent, for example, MS 104. In one embodiment of the invention, MS 200 may comprise a microphone 202, an analog-to-digital (A/D) converter 204, a voice encoder/decoder ("vocoder") 206, a transceiver 208 and an ASR control module 210.

In one embodiment of the invention, microphone 202 may receive analog speech signals from, for example, a human speaker. Microphone 202 may send the analog speech signals to A/D converter 204.

A/D converter 204 may receive the analog speech signals and convert them into digital speech signals represented as a sequence or stream of bits. Each bit may represent, for example, a one (1) or a zero (0). The conversion may be performed in accordance with any A/D conversion scheme, such as Pulse Coded Modulation (PCM). The output of an A/D converter using PCM, for example, may be a 64 kilobits per second (kbps) signal. A/D converter 204 may send the stream of bits to vocoder 206.

Vocoder 206 may implement any conventional voice compression algorithm to reduce the digital speech signals. For example, in one embodiment of the invention vocoder 206 may implement a voice compression scheme in accordance with International Telecommunications Union (ITU) Recommendation G.723.1 titled "Dual Rate Speech Coder For Multimedia Communications Transmitting at 5.3 and 6.3 k/bps," approved March 1996 ("G.723 Specification").

In one embodiment of the invention, vocoder 206 includes logic to format the compressed or uncompressed digital speech signals into the appropriate frames and/or packets, and send the formatted information to transceiver 208 for communication over a voice or data channel. It can be appreciated, however, that this function may be implemented anywhere within MS 200 and still fall within the scope of the invention.

Transceiver 208 may comprise a transmitter, receiver and logic sections for MS 200. The transmitter may convert low-level audio signals to proportional shifts in the RF carrier frequency. The receiver may amplify and demodulate low-level RF signals into their original audio form. The control section may coordinate this operation by the insertion and extraction of appropriate system control messages. Transceiver 208 may be connected to an antenna assembly (not shown).

Transceiver 208 may communicate information over RF spectrum. For example, a GSM system may use RF bands 890-915 mega-hertz (MHz) for an uplink between MS 200 and BS 106, and RF bands 935-960 MHz for a downlink between BS 106 and MS 200. Since RF spectrum is a limited resource shared by all users, various technologies exist to divide up available bandwidth among as many users as possible. For example, a GSM system may use a combination of Time-Division Multiple Access (TDMA) and Frequency-Division Multiple Access (FDMA). The FDMA part may involve, for example, dividing a 25 MHz bandwidth into 124 carrier frequencies spaced 200 kHz apart. One or more carrier frequencies are assigned to each base station, including BS 106. Each of these carrier frequencies may also be divided in time using a TDMA scheme. The fundamental unit of time in a TDMA scheme may be referred to as a "burst period" and may last 0.577 milliseconds (ms). Eight burst periods may be grouped into a TDMA frame. A frame may represent a logical set of bits having a fixed or variable length. A TDMA frame, for example, may be approximately 4.615 ms, and may form the basic unit for the definition of logical voice or data channels. One physical channel, for example, may be one burst period per TDMA frame. In one embodiment of the invention, a channel may be defined by the number and position of their corresponding burst periods. All these definitions may be cyclic, and the entire pattern may repeat after a certain time period.

ASR control module 210 may provide control signals to vocoder 206 and/or transceiver 208 to switch between sending encoded voice information over a voice channel or a data channel. ASR control module 210 may receive an external signal indicating when to perform the switch, and instruct vocoder 206 and/or transceiver 208 accordingly.

In one embodiment of the invention, ASR control module 210 may instruct vocoder 206 to not perform speech compression to the input digital speech signals, and to send the uncompressed digital speech signals to transceiver 208 for transmission over the appropriate data channel. This embodiment of the invention may increase bandwidth requirements for the speech signals but may result in higher quality speech by reducing speech degradation due to encoding and decoding errors.

In one embodiment of the invention, ASR control module 210 may instruct vocoder 206 to perform speech compression to the input digital speech signals, and to send the compressed digital speech signals to transceiver 208 for transmission over the appropriate data channel. This embodiment of the invention may reduce bandwidth requirements for the speech signals and yet may yield higher quality speech by utilizing enhanced error correction protocols.

In one embodiment of the invention, ASR control module 210 may insert codes to indicate the start and end points of a voice response to the request for speech information. The codes may be, for example, a predefined sequence or pattern of bits. The ASR control module 210 may insert the codes in response to user inputs or inputs from an ASR system or BS, such as BS 104.

Figure 3:
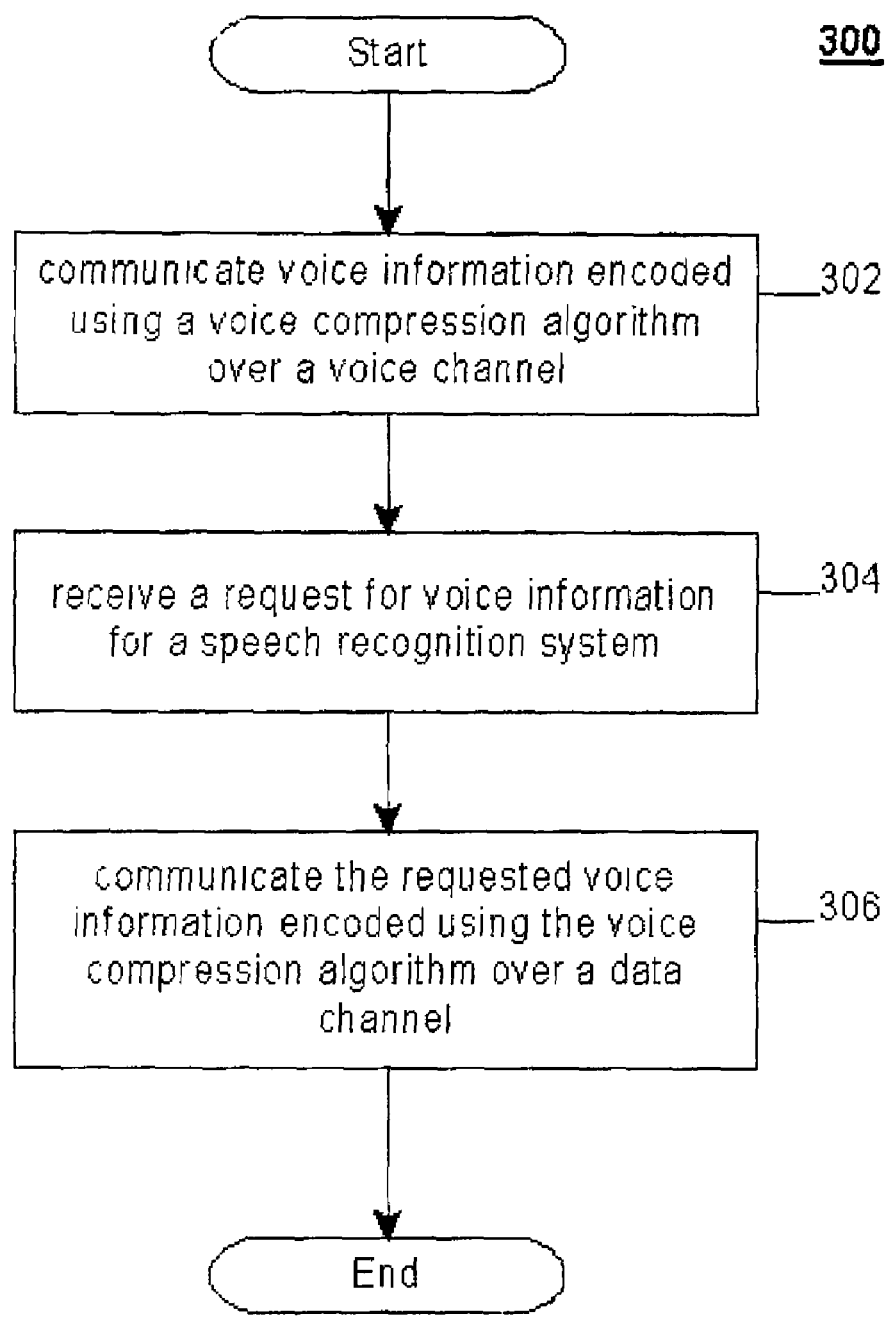
FIG. 3 is a first block flow diagram of programming logic performed by a mobile station in accordance with one embodiment of the invention.
Figure 4:
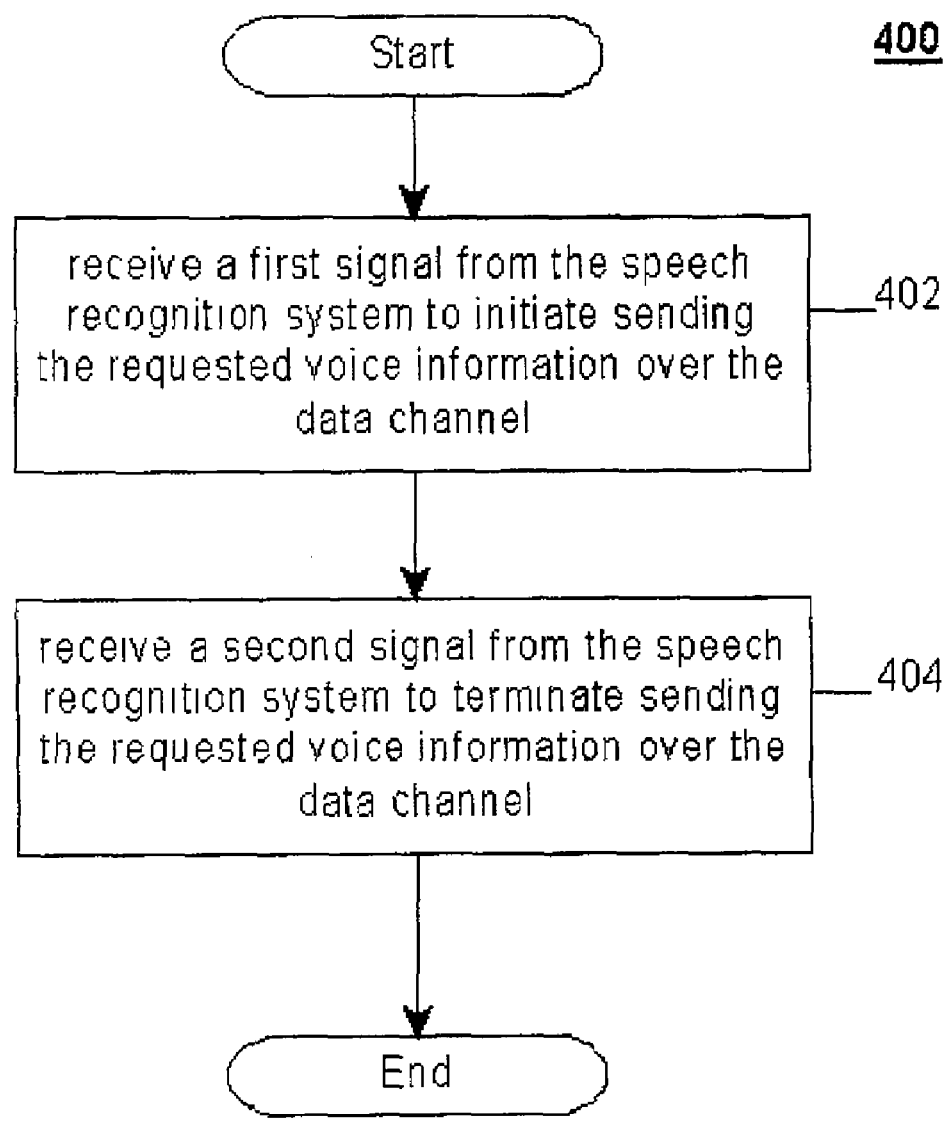
FIG. 4 is a second block flow diagram of programming logic performed by a mobile station in accordance with one embodiment of the invention.

The operations of systems 100 and 200 may be further described with reference to FIGS. 3-4 and accompanying examples. Although FIGS. 3-4 presented herein may include a particular processing logic, it can be appreciated that the processing logic merely provides an example of how the general functionality described herein can be implemented. Further, each operation within a given processing logic does not necessarily have to be executed in the order presented unless otherwise indicated.

FIG. 3 is a first block flow diagram of programming logic performed by a mobile station in accordance with one embodiment of the invention. FIG. 3 illustrates programming logic 300 to perform speech recognition. Voice information may be encoded using a voice compression algorithm and communicated over a voice channel at block 302. A request for voice information for a speech recognition system may be received at block 304. The request may be, for example, a prompt for a voice command. The requested voice information may be encoded using the same voice compression algorithm and communicated over a data channel at block 306.

In one embodiment of the invention, the voice information may be communicated by receiving an analog audio waveform representing speech. The analog audio waveform may be converted into a digital audio signal. The digital audio signal may be encoded using the voice compression algorithm, and transmitted over the voice channel.

In one embodiment of the invention, the requested voice information may be communicated by receiving an analog audio waveform representing speech. The analog audio waveform may be converted into a digital audio signal. The digital audio signal may be encoded using the voice compression algorithm, and transmitted over the data channel.

FIG. 4 is a second block flow diagram of programming logic performed by a mobile station in accordance with one embodiment of the invention. FIG. 4 illustrates programming logic 400 to perform speech recognition by communicating a digital audio signal over a data channel. A first signal may be received from the speech recognition system to initiate sending the requested voice information over said data channel at block 402. The digital audio signal may be transmitted over the data channel in accordance with the first signal. Once the requested voice information has been sent over the data channel, a second signal from the speech recognition system may be received at block 404. The second signal may be a termination signal to terminate transmission of voice information over the data channel. Transmission of the digital audio signal over the data channel may be terminated in accordance with the second signal. The first signal and the second signal may each be, for example, a unique sequence or pattern of bits.

Figure 5:
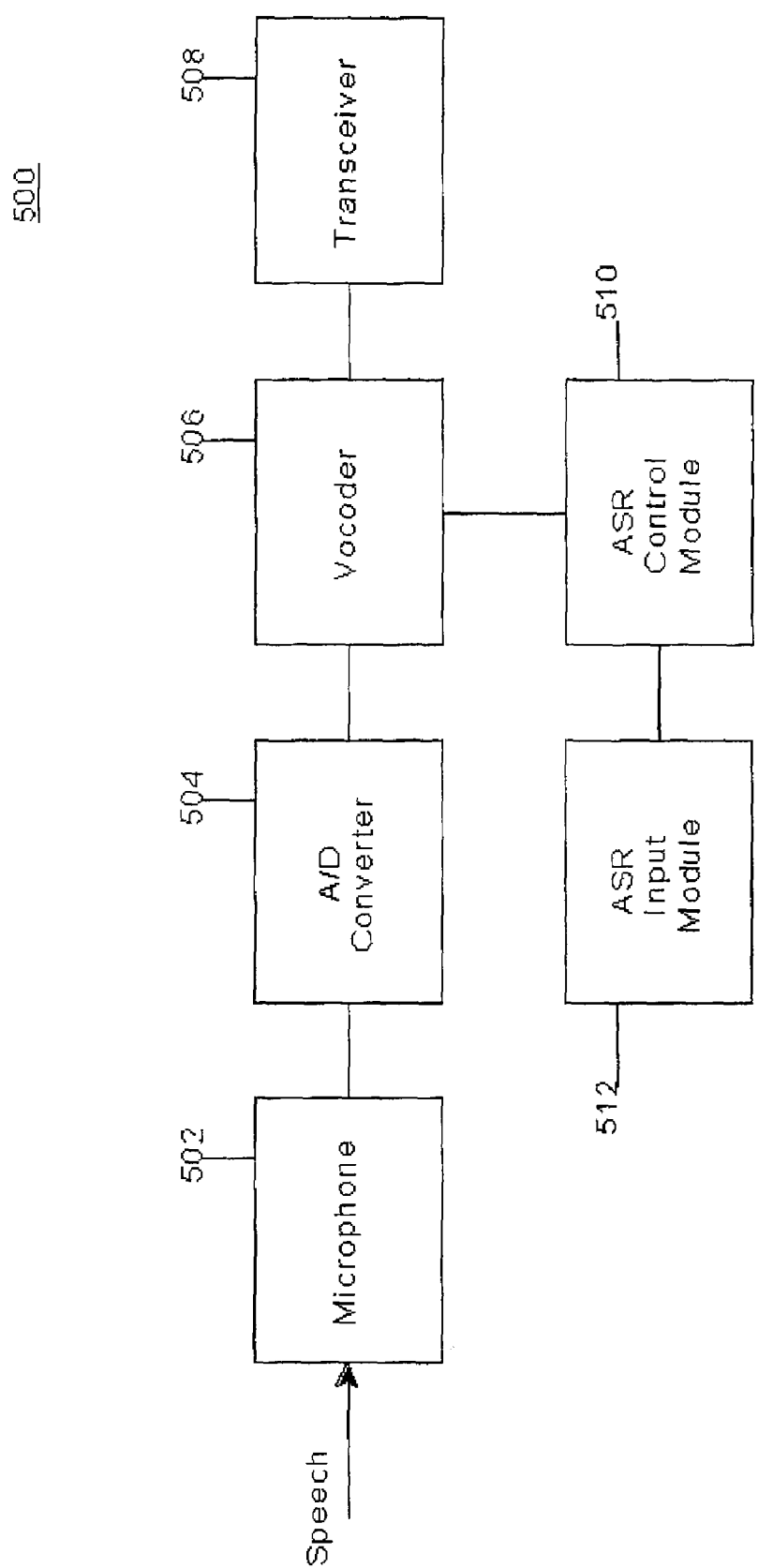
FIG. 5 is a second block diagram of a mobile station in accordance with one embodiment of the invention.

FIG. 5 is a second block diagram of a mobile station in accordance with one embodiment of the invention. FIG. 5 illustrates a MS 500 that may represent, for example, MS 104. In one embodiment of the invention, MS 500 may comprise a microphone 502, an A/D converter 504, a vocoder 506, a transceiver 508, an ASR control module 210 and an ASR input module 512. In operation, elements 502-510 operate similar to corresponding elements 202-210. In one embodiment of the invention, ASR input module 512 may detect and generate user commands to send voice information over a data channel. More particularly, a user may indicate to MS 500 when to switch sending voice information over a voice channel to a data channel, and vice-versa, via an input device.

Figure 6:
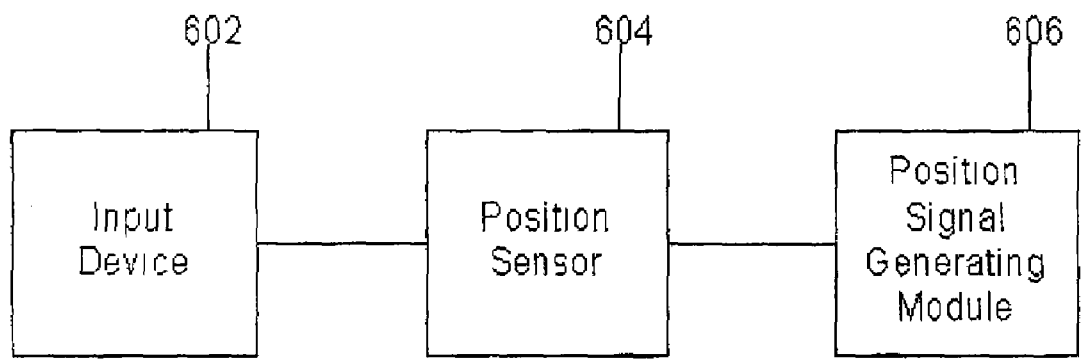
FIG. 6 is a block diagram of an automatic speech recognition (ASR) input module in accordance with one embodiment of the invention.

FIG. 6 is a block diagram of an automatic speech recognition (ASR) input module in accordance with one embodiment of the invention. FIG. 6 illustrates an ASR input module 600 that may represent, for example, ASR input module 512. In one embodiment of the invention, ASR input module may comprise an input device 602, a position sensor 604 and a position signal generating module 606. Input device 602 may be a mechanical, electrical or optical device that may allow a user to switch between two states. For example, input device 602 may be button placed on a MS, such as MS 104. Position sensor 604 may monitor input device 602 to determine its current position or state. Position sensor 604 may send this information to position signal generating module 606. Position signal generating module 606 may receive the state or position information from position sensor 604. Position signal generating module 606 may generate a signal corresponding to a one or more states or positions and send the signal to ASR control module 510. ASR control module 510 may coordinate insertion of the appropriate start and end codes for the speech information in accordance with the position signal, and instruct vocoder 506 to format the uncompressed or compressed digital speech signals into the appropriate transmission format.

The operations of systems 500 and 600 may be further described with reference to FIG. 7 and accompanying examples. Although FIG. 7 presented herein may include a particular processing logic, it can be appreciated that the processing logic merely provides an example of how the general functionality described herein can be implemented.

Further, each operation within a given processing logic does not necessarily have to be executed in the order presented unless otherwise indicated.

Figure 7:
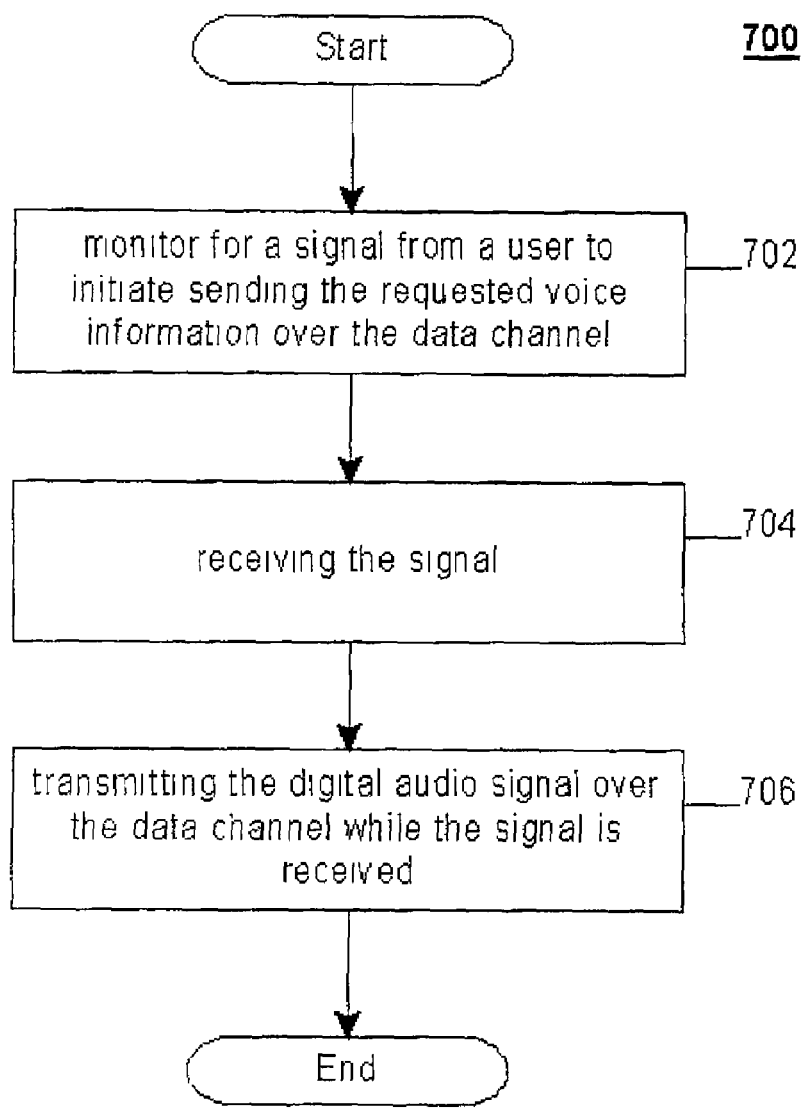
FIG. 7 is a third block flow diagram of programming logic performed by a mobile station in accordance with one embodiment of the invention.

FIG. 7 is a third block flow diagram of programming logic performed by a mobile station in accordance with one embodiment of the invention. FIG. 7 illustrates a programming logic 700 to perform speech recognition by transmitting requested voice information over a data channel. Monitoring is performed for a signal from a user to initiate sending the requested voice information over the data channel at block 702. The signal from the user may be received at block 704. The requested voice information in the form of a digital audio signal may be transmitted over the data channel while the signal is received at block 706.

In one embodiment of the invention, the request for voice information may be sent by a speech recognition system over the voice channel. A first signal may also be sent over the voice channel to initiate sending the requested voice information over the data channel. The requested voice information may be received by the speech recognition system over the data channel. A second signal may be sent over the voice channel to terminate sending the requested voice information over the data channel. In other words, once the requested voice information has been received the speech recognition system may send a second signal indicating to resume normal operation by sending voice information over the voice channel. Speech recognition may then be performed using the requested voice information.

The operation of systems 100, 200, 500 and 600, and FIGS. 3-4 and 7, may be better understood by way of example. Assume MS 106 is a cellular telephone. Assume BS 104 is connected to speech recognition system 102. Speech recognition system 102 may be an application server having a software application to perform automated directory assistance. BS 104 and MS 106 may communicate using voice channels and data channels defined using RF spectrum. The data channels are part of a packet-switched network. A user initiates a connection with the application server over a voice channel. The server provides some introductory information to the user on how to use the service. This information is sent using a normal voice compression scheme, such as G.723.

Speech recognition system 102 may give a voice prompt for a name to initiate the directory assistance search. BS 104 may communicate the voice prompt to MS 106. Speech recognition system 102 or BS 104 may also send a signal indicating that MS 106 is to begin sending voice information over a higher quality channel, such as a data channel.

The user may provide the spoken response to the voice prompt. MS 106 may convert the analog audio signals into digital audio signals, and compress the signal using the same voice compression scheme used for the normal voice channel. MS 106 may then proceed to send the spoken response over the data channel. The data channel is designed to provide higher quality information. This higher quality information may result from increased data channel bandwidth such as a faster transmission rate (e.g., 171 kbps) as compared to normal voice channel bandwidth (5.3 kpbs), application of an improved error correction scheme, or both, although the embodiments of the invention are not limited in this context.

BS 104 may receive the spoken information over the data channel, and pass the spoken information to speech recognition system 102. Speech recognition system 102 may receive the spoken voice information and begin performing the speech recognition process. The speech recognition process converts the spoken voice information into another format, such as text. In this example, the spoken voice information may comprise the name of the person for which a number is desired. The text of the requested name may be sent to the automated directory assistance software, to begin the number lookup process.

Once MS 106 sends the requested voice information to BS 104, subsequent voice information may be passed using the voice channel per normal cell phone operations. Speech recognition system 102 or BS 104 may send a signal to terminate sending voice information over the data channel. Alternatively, speech recognition system 102 or BS 104 may have sent a predetermined time interval to MS 106, and at the expiration of the predetermined time interval all voice communications are switched back to the voice channel.

In another example, MS 106 may include an input device, such as input device 602, that may be a button. The button may have two positions including activated and deactivated, or pressed and released. If a user receives a prompt for a voice command from speech recognition system 102, the user may press the button to indicate that the following spoken voice information is to be transmitted over a data channel. Once the user finishes providing the spoken voice information, the user may release the button indicating that MS 106 is to resume normal operations, which means spoken voice information is to be transmitted over the voice channel.

In another embodiment of the invention, MS 106 may be connected to an automated system. Therefore, communications between the automated system and MS 106 may be sent via a normal voice channel, while communications between MS 106 and the automated system may be communicated over the data channel, since the automated system is unconcerned about speech latencies. This embodiment may reduce the need to switch between the voice and data channels during a given communication session.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A communications method, comprising:
    encoding voice information to be communicated over a voice channel using a voice compression algorithm;
    switching from said voice channel to a data channel;
    encoding voice information to be communicated over said data channel using said voice compression algorithm used for said voice channel; and
    communicating encoded voice information over said data channel.

2. The method of claim 1, wherein said data channel provides higher quality voice information than said voice channel.

3. The method of claim 1, further comprising:
    receiving an analog audio waveform representing speech;
    converting said analog audio waveform into a digital audio signal; and
    encoding said digital audio signal using said voice compression algorithm.

4. The method of claim 3, further comprising transmitting said digital audio signal over said voice channel.

5. The method of claim 3, further comprising transmitting said digital audio signal over said data channel.

6. The method of claim 5, further comprising:
receiving a first signal from said speech recognition system to initiate sending said requested voice information over said-data channel; and
transmitting said digital audio signal over said data channel in accordance with said first signal.

7. The method of claim 6, further comprising:
receiving a second signal from said speech recognition system to terminate sending said requested voice information over said data channel; and
terminating transmission of said digital audio signal over said data channel in accordance with said second signal.

8. The method of claim 5, further comprising:
monitoring for a signal from a user to initiate sending said requested voice information over said data channel;
receiving said signal from said user; and
transmitting said digital audio signal over said data channel while said signal is received.

9. The method of claim 1, further comprising receiving a request for voice information.

10. The method of claim 9, wherein said request comprises a prompt for a voice command from a speech recognition system.

11. The method of claim 1, further comprising:
sending a request for voice information for a speech recognition system over said voice channel;
receiving requested voice information over said data channel; and
performing speech recognition of said requested voice information.

12. The method of claim 11, further comprising:
sending a first signal over said voice channel to initiate sending said requested voice information over said data channel; and
receiving said requested voice information over said data channel in accordance with said first signal.

13. The method of claim 12, further comprising sending a second signal over said voice channel to terminate sending said requested voice information over said data channel.

14. The method of claim 1, further comprising:
communicating encoded voice information in accordance with one or more Global System For Mobile Communications (GSM) standards.

15. The method of claim 1, further comprising:
communicating encoded voice information in accordance with one or more General Packet Radio System (GPRS) standards.

16. An apparatus, comprising:
a vocoder to encode speech using a voice compression algorithm;
a transceiver to communicate encoded speech over one of a voice channel and a data channel; and
a switching device to switch from said voice channel to said data channel,
said vocoder to encode speech to be communicated over said data channel using the voice compression algorithm used for said voice channel after switching from said voice channel to said data channel.

17. The apparatus of claim 16, said switching device comprising an input device to move between a first position and a second position.

18. The apparatus of claim 17, further comprising:
a position sensor to determine when said input device is in said first position and said second position; and
a position signal generating module to generate a signal indicating when said input device is in one of said first and second positions.

19. The apparatus of claim 17, said input device comprising a button.

20. The apparatus of claim 16, further comprising:
a microphone to receive analog speech signals; and
an analog-to-digital converter to convert said analog speech signals into digital speech signals.

21. The apparatus of claim 16, further comprising:
an automatic speech recognition (ASR) control module to control when said encoded speech is communicated over said voice channel and said data channel.

22. The apparatus of claim 21, further comprising:
an ASR input module to generate a signal from a user, said ASR control module to receive said signal and cause said encoded speech to be communicated over said data channel while said signal is received.

23. The apparatus of claim 16, said transceiver to communicate encoded voice information in accordance with one or more Global System For Mobile Communications (GSM) standards.

24. The apparatus of claim 16, said transceiver to communicate encoded voice information in accordance with one or more General Packet Radio System (GPRS) standards.

25. A wireless communication system, comprising:
a speech recognition system;
a base station in communication with said speech recognition system; and
a mobile station to communicate with said base station, said mobile station comprising:
a vocoder to encode speech using a voice compression algorithm;
a transceiver to communicate encoded speech over one of a voice channel and a data channel; and
a switching device to switch from said voice channel to said data channel,
said vocoder to encode speech to be communicated over said data channel using the voice compression algorithm used for said voice channel after switching from said voice channel to said data channel.

26. The system of claim 25, said switching device comprising an input device to move between a first position and a second position.

27. The system of claim 26, said mobile station further comprising:
a position sensor to determine when said input device is in said first position and said second position; and
a position signal generating module to generate a signal indicating when said input device is in one of said first and second positions.

28. The system of claim 26, said input device comprising a button.

29. The system of claim 25, said mobile station further comprising:
a microphone to receive analog speech signals; and
an analog-to-digital converter to convert said analog speech signals into digital speech signals.

30. The system of claim 25, further comprising:
an automatic speech recognition (ASR) control module to control when said encoded speech is communicated over said voice channel and said data channel.

31. The system of claim 30, further comprising:
an ASR input module to generate a signal from a user, said ASR control module to receive said signal and cause said encoded speech to be communicated over said data channel while said signal is received.

32. The system of claim 25, said transceiver to communicate encoded voice information in accordance with one or more Global System For Mobile Communications (GSM) standards.

33. The system of claim 25, said transceiver to communicate encoded voice information in accordance with one or more General Packet Radio System (GPRS) standards.

* * * * *